United States Patent
Larsson et al.

(10) Patent No.: US 8,576,932 B2
(45) Date of Patent: Nov. 5, 2013

(54) METHODS AND ARRANGEMENTS IN A WIRELESS COMMUNICATION SYSTEM FOR PRODUCING SIGNAL STRUCTURE WITH CYCLIC PREFIX

(75) Inventors: Peter Larsson, Solna (SE); Henrik Sahlin, Mölnlycke (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 283 days.

(21) Appl. No.: 12/997,585

(22) PCT Filed: Jun. 13, 2008

(86) PCT No.: PCT/SE2008/050712
§ 371 (c)(1),
(2), (4) Date: Dec. 11, 2010

(87) PCT Pub. No.: WO2009/151358
PCT Pub. Date: Dec. 17, 2009

(65) Prior Publication Data
US 2011/0080967 A1    Apr. 7, 2011

(51) Int. Cl.
H04L 27/28    (2006.01)
(52) U.S. Cl.
USPC .......................................................... 375/260
(58) Field of Classification Search
USPC .......................................................... 375/260
See application file for complete search history.

(56) References Cited

U.S. PATENT DOCUMENTS

2004/0218522 A1    11/2004  Sundstrom et al.
2006/0068698 A1    3/2006   Sandhu et al.
2008/0025431 A1 *  1/2008   Horikawa et al. ............. 375/295
2009/0028256 A1 *  1/2009   van Veen et al. ............... 375/260
2010/0111017 A1 *  5/2010   Um et al. ........................ 370/329

FOREIGN PATENT DOCUMENTS

| EP | 1605658 A1 | 12/2005 |
| EP | 1873989 A1 | 1/2008 |
| JP | 2004-056552 A | 2/2004 |

OTHER PUBLICATIONS

EPO, Int'l Search Report in PCT/SE2008/050712, Jul. 16, 2009.
EPO, Int'l Preliminary Report on Patentability in PCT/SE2008/050712, Sep. 6, 2010.
Fujitsu, Initial Cell Search and Long-CP Sub-Frame Structure, Tdoc R1-063343, Nov. 6, 2006, 3GPP RAN WG1 meeting #47, Riga, Latvia.

* cited by examiner

*Primary Examiner* — Don N Vo
(74) *Attorney, Agent, or Firm* — Potomac Patent Group PLLC

(57) ABSTRACT

The present invention relates to methods and arrangements in a wireless communication system supporting cyclic-prefix insertion, using a symbol sequence comprising a number of samples for transmission over a radio channel that enables the handling of very large signal delay spreads. The symbol sequence is built up by a first symbol with CP and a second symbol with CP. The second symbol is a copy of the first symbol with the samples shifted in a way that makes the two adjacent symbols with CP match in regards to the sample order. The symbol sequence may also comprise a third symbol with CP or more, where the third symbol is a copy of the second symbol and with the samples shifted in analogy with the symbol shift described above. The resulting symbol sequence will thus appear as an extended continuous symbol thanks to the precise cyclic shift that matches adjacent symbols. This allows the receiver to place its FFT window anywhere during the extended symbol, e.g. at the end of the symbol sequence thus making it possible to handle a delay spread longer than the CP duration. It also allows to place e.g. two FFT windows and to combine the extracted signal into one SNR improved signal, while still handling a longer delay spread.

22 Claims, 11 Drawing Sheets

METHODS AND ARRANGEMENTS IN A WIRELESS COMMUNICATION SYSTEM FOR PRODUCING SIGNAL STRUCTURE WITH CYCLIC PREFIX

TECHNICAL FIELD

The present invention relates to the area of wireless communications, and especially to the use of cyclic-prefix insertion for long range radio communication or radio communication in a high delay spread channel.

BACKGROUND

The Universal Mobile Telecommunication System (UMTS) is one of the third generation mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency, lowered costs etc. UMTS Terrestrial Radio Access Network (UTRAN) is the radio access network of a UMTS system and evolved UTRAN (E-UTRAN) is the radio access network of an LTE system. As illustrated in FIG. 8, an E-UTRAN typically comprises user equipments (UE) 850 wirelessly connected to a radio base station 800.

Orthogonal Frequency Division Multiplexing (OFDM) has been adopted as the transmission scheme for the radio interface in 3GPP LTE and is also used for several other radio access technologies and standards such as Digital Video Broadcasting (DVB), Digital Audio Broadcasting (DAB), IEEE 802.11a/g (WLAN/WiFi), IEEE 802.16 (WiMAX), Hiperlan 2, and various Digital Subscriber Line (xDSL). OFDM is a frequency-division multiplexing scheme utilized as a digital multi-carrier modulation method. A large number of closely-spaced orthogonal sub-carriers are used to carry data. The data is divided into several parallel data streams or channels, one for each sub-carrier. Each sub-carrier is modulated with a conventional modulation scheme (such as quadrature amplitude modulation or phase shift keying) at a low symbol rate, maintaining total data rates similar to conventional single-carrier modulation schemes in the same bandwidth. To be a bit more specific, a variant of OFDM, namely Orthogonal Frequency Division Multiple Access (OFDMA), is used for 3GPP LTE and allows different users to be multiplexed on different sets of sub-carriers. The uplink in 3GPP LTE is based on Singe Carrier Frequency Division Multiplexing (SC-FDMA), which also can be regarded as DFT pre-spread OFDM with a cyclic prefix (the use of cyclic prefix is described below). An LTE uplink sub frame is schematically illustrated in FIG. 7b.

In traditional Frequency Division Multiplexing (FDM), different users are allocated different frequencies, or channels, for their transmission. To avoid interference between these channels the FDM frequencies must be spaced apart, which leads to a waste of frequency spectrum. In OFDM, the frequencies of the sub-carriers are chosen in such a way that they do not interfere with each other—they are orthogonal. This allows for a tighter "packing" of the sub-carriers and increased spectrum efficiency in comparison to FDM. To ensure orthogonality the sub-carriers must have a common, precisely chosen frequency spacing or sub-carrier spacing and this frequency spacing is exactly the inverse of the OFDM symbol duration. Due to its specific structure, OFDM allows for low-complexity implementation for the modulation and demodulation, by means of Discrete Fourier Transform (DFT) operations for which computationally efficient Fast Fourier Transform (FFT) algorithms exist.

As the data is divided into several parallel data streams or channels, one for each sub-carrier, the symbol rate of each sub-carrier is much lower than the total symbol rate and the sub-carrier symbol length is thus extended. This reduces the systems sensitivity to inter symbol interference (ISI) due to multipath effects (i.e. different versions of the same signal travelling different paths over the radio interface and thus arriving at the receiver at different points in time, resulting in a signal delay spread). The explanation is that ISI due to multipath depends on the relation between the signal delay spread and the symbol length, so if the symbol length is extended the system will be more robust to multipath effects.

However, although the system is more robust to multipath effects, there will still be some ISI left. This is why a guard interval between the symbols is introduced, allowing multipath to settle before the main data arrives at the receiver. Thanks to such a guard interval, there will be no ISI as long as the delay spread does not exceed the guard interval duration. A commonly used mechanism in different radio access systems, illustrated in FIG. 1, is to insert a cyclic-prefix (CP) 102 in this guard interval in front of the symbol 101. The CP is a copy of the last part 103 of the symbol 101. To avoid confusion, the symbol comprising the CP will be called the "symbol with CP" 100, to be able to distinguish it from a symbol 101 comprising only the useful part. Note that CP insertion can be used in single carrier systems as well as in multi carrier systems.

CP insertion in OFDM implies that the linear convolution inherent in the radio channel can be translated into a cyclic convolution. This cyclic convolution has the benefit to translate into an element wise multiplication when DFT or FFT transforms are considered. Moreover, this mitigates inter-channel interference among the sub-carriers.

In different systems and standards, two or more different CP duration alternatives have been incorporated to cater for the different propagation conditions. In LTE for example, a short CP to use when the delay spread is small has been specified (thus permitting low overhead), as well as a long CP when the delay spread is large (thereby sacrificing throughput somewhat).

In some scenarios, the signal delay spread might however still be larger than the defined CP duration, which would then result in ISI problems. This may for instance arise in the situations schematically illustrated in FIG. 2a-d:

FIG. 2a: Very large cells 200a with severe multipath between the base station 201a and the UE 202a due to the long distances.

FIG. 2b: Single Frequency Networks (SFN) 200b with multiple transmitters sending the same signal from widely separated base stations 201b and 203b to one UE 202b, as for example in DVB and DAB systems.

FIG. 2c: On-frequency repeater stations (RS) 203c inducing a significant delay of the signal forwarded from the base station 201c to the UE 202c.

FIG. 2d: Distributed antenna systems (DAS) 205d where, from a signal processing point of view, it is preferable that signals from different widely separated radio heads, 201d and 203d, are overlapping in time when received by the UE 204d.

In systems with very large distances between transmitters and receivers, such as in cellular systems with large cell sizes (FIG. 2a), another problem is that the received power is quite significantly reduced as well.

SUMMARY

The object of the present invention is to achieve methods and arrangements that obviate some of the above disadvantages and enable the handling of very large signal delay spreads (exceeding the CP duration) for certain users, while keeping the handling of "normal" signal delay spread for other users.

This is achieved by a solution based on a symbol sequence design procedure. The symbol sequence is built up by a first symbol with CP and a second symbol with CP. The second symbol is a copy of the first symbol with the samples shifted in a way that makes the two adjacent symbols with CP match in regards to the sample order. The symbol sequence may also comprise a third symbol with CP, where the third symbol is a copy of the second symbol and with the samples shifted in analogy with the symbol shift described above. The sequence may continue with even more symbols with CP arranged in a corresponding way. The resulting symbol sequence will thus appear as an extended continuous symbol thanks to the precise cyclic shift that matches adjacent symbols. This allows the receiver to place its FFT window anywhere during the extended symbol, e.g. in a way that enables the handling of very large signal delay spreads.

Thus in accordance with a first aspect of the present invention, a method for a wireless communication system supporting cyclic-prefix insertion, using a symbol sequence comprising a number of samples for transmission over a radio channel is provided. The method comprises the step of transmitting a first symbol of the sequence preceded by a first cyclic-prefix. It further comprises the step of transmitting a second symbol of the sequence preceded by a second cyclic-prefix. This second symbol comprises the samples of the first symbol shifted so that the last sample of the first symbol and the first sample of the second cyclic-prefix are cyclically consecutive.

In accordance with a second aspect of the present invention, a method for a wireless communication system supporting cyclic-prefix insertion, using a symbol sequence comprising a number of samples for transmission over a radio channel is provided. The method comprises the step of receiving a first symbol of the sequence preceded by a first cyclic-prefix. It further comprises the step of receiving a second symbol of the sequence preceded by a second cyclic-prefix. The second symbol comprises the samples of the first symbol shifted so that the last sample of the first symbol and the first sample of the second cyclic-prefix are cyclically consecutive. The method also comprises the step of placing at least one Fast Fourier Transform (FFT) window during the symbol sequence.

In accordance with a third aspect of the present invention, a transmitting unit for a wireless communication system supporting cyclic-prefix insertion, using a symbol sequence comprising a number of samples for transmission over a radio channel is provided. The unit comprises means for transmitting a first symbol of the sequence preceded by a first cyclic-prefix. It also comprises means for transmitting a second symbol of the sequence preceded by a second cyclic-prefix. The second symbol comprises the samples of the first symbol shifted so that the last sample of the first symbol and the first sample of the second cyclic-prefix are cyclically consecutive.

In accordance with a fourth aspect of the present invention, a receiving unit for a wireless communication system supporting cyclic-prefix insertion, using a symbol sequence comprising a number of samples for transmission over a radio channel is provided. The unit comprises means for receiving a first symbol of the sequence preceded by a first cyclic-prefix. It also comprises means for receiving a second symbol of the sequence preceded by a second cyclic-prefix. The second symbol comprises the samples of the first symbol shifted so that the last sample of the first symbol and the first sample of the second cyclic-prefix are cyclically consecutive. The unit also comprises means for placing at least one Fast Fourier Transform (FFT) window during the symbol sequence.

An advantage of embodiments of the present invention is that they allow for handling of very large signal delay spreads in any system using CP insertion, i.e. signal delay spreads that exceed the CP duration.

DETAILED DESCRIPTION

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practiced in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular the invention is described in a non-limiting general context in relation to a 3GPP LTE system. It should though be noted that the invention and its exemplary embodiments may also be applied to other types of radio access technologies with similar characteristics to 3GPP LTE in terms of CP insertion, e.g. DAB, DVB, the 802.11 and 802.16 standard family or a single carrier systems using CP insertion.

Figure 3:
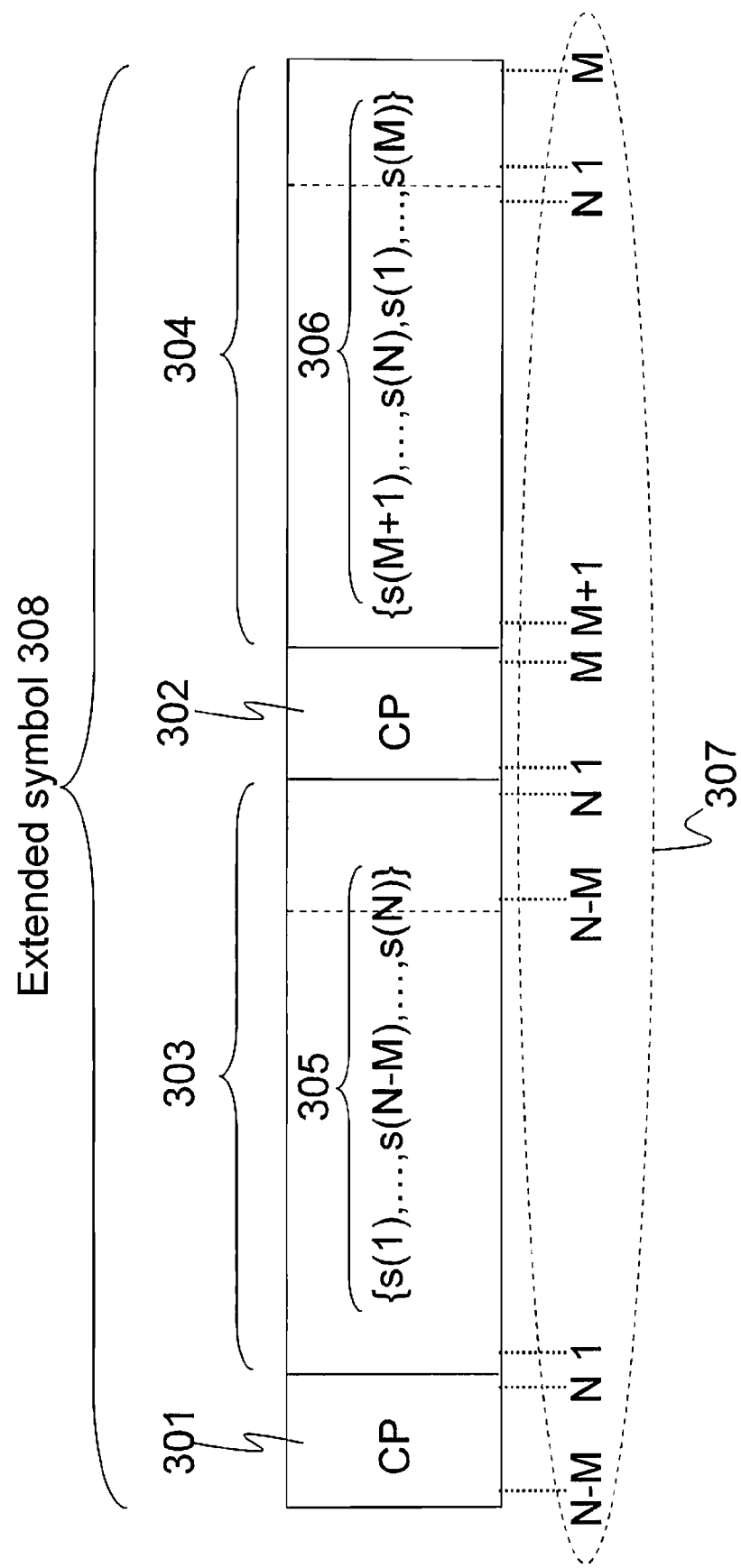
FIG. 3 illustrates schematically the symbol sequence design according to one embodiment of the present invention.

There are various scenarios, such as the ones illustrated in FIGS. 2a-d, where the delay spread for certain users becomes larger than the prior art CP allows. The present invention makes it possible to handle such large signal delay spreads for these users, by using a specific symbol sequence for the transmission over the uplink and the downlink radio channels, while keeping the "normal" symbols with CP for the handling of more limited signal delay spread for all other users. The symbol sequence design principle, according to one embodiment, is illustrated in FIG. 3. In this embodiment the symbol sequence comprises only two symbols with CP, although more symbols with CP can be included in the sequence, as will be described below. The symbol sequence is built up of a first symbol 303 with a first CP 301 and a second symbol 304 with a second CP 302. The second symbol 304 is a copy of the first symbol 303 with the samples 306 shifted in a way that makes the two adjacent symbols with CP match. Two symbols will match when their samples or sample indices are cyclically consecutive. This matching is described more in detail below.

Figure 1:
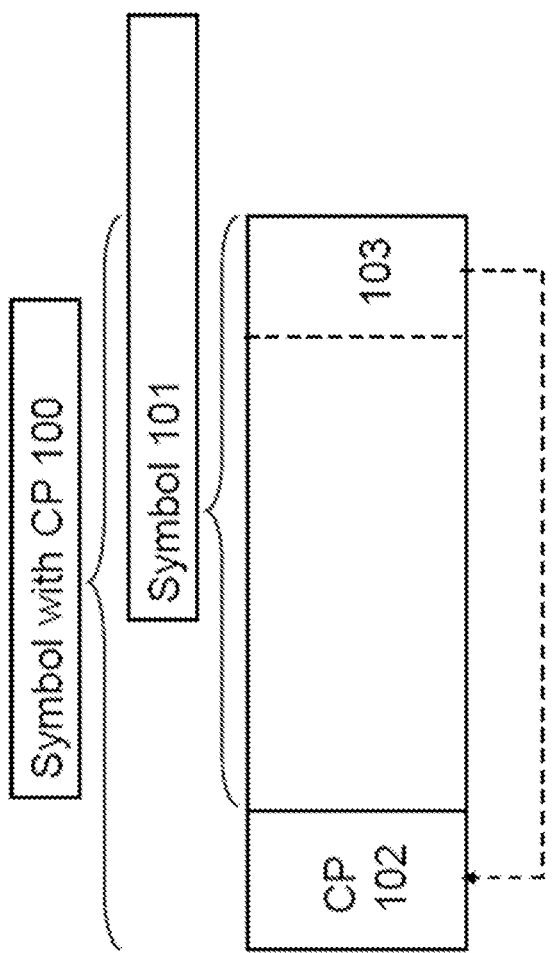
FIG. 1 illustrates schematically the usage of CP insertion according to prior art.
Figure 2B:
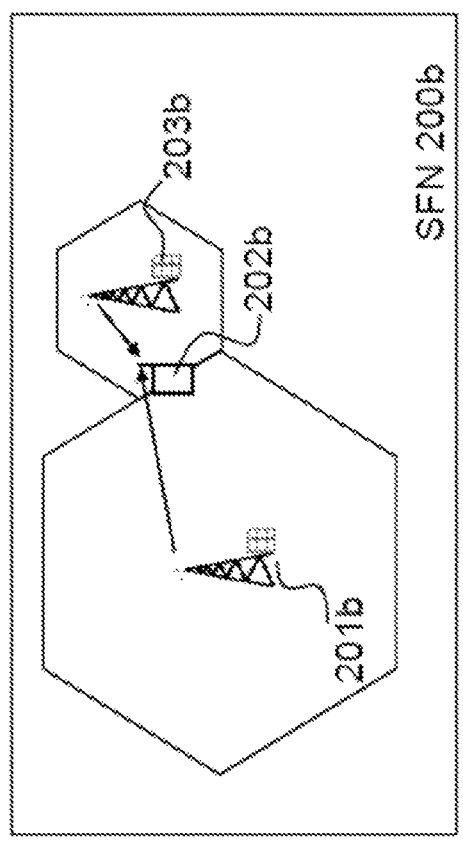
FIG. 2a-d illustrates schematically some example scenarios where large delay spread can arise.
Figure 2D:
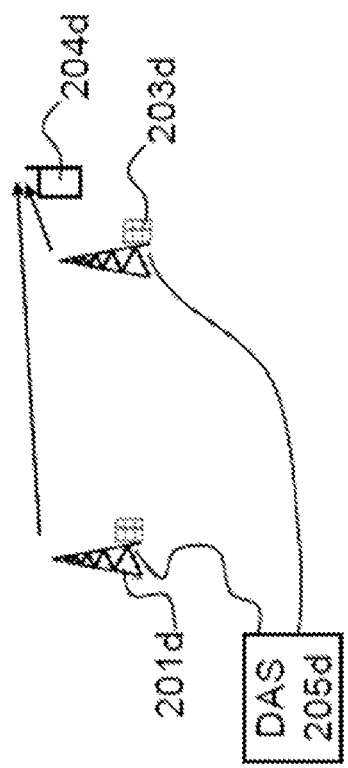
Figure 2A:
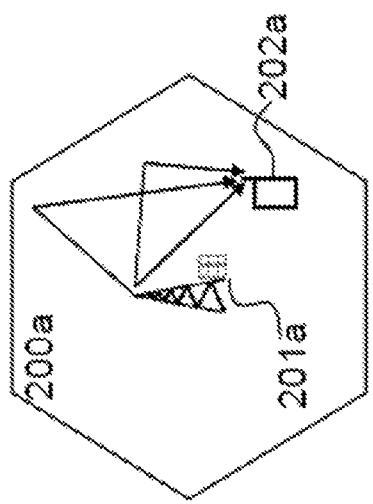
Figure 2C:
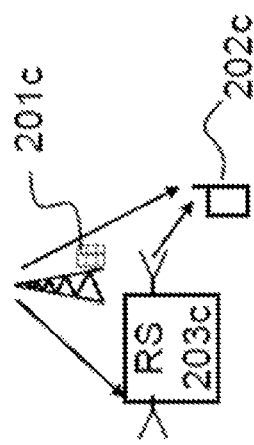

Each symbol comprises a sequence of samples s(n), where n is the index 307 of the sample in the sequence and ranges from 1 to N. In FIG. 3 the sample sequence of the first symbol 305, starts with index n=1 and ends with index n=N, $\{s(1), \ldots, s(N-M), \ldots, s(N)\}$. The first CP 301 comprises the last M samples of this sequence i.e. $\{s(N-M), \ldots, s(N)\}$, which are thus replicated and appended in front of the first symbol 303, as described previously with reference to FIG. 1. The last sample of the first symbol 303 is thus s(N). The cyclically consecutive sample to s(N) is s(1), which means that the second CP 302 must consist of the samples $\{s(1), \ldots, s(M)\}$ in order to get matching symbols. This in turn means that the sample sequence of the second symbol 306 should be $\{s(M+1), \ldots, s(N), s(1), \ldots, s(M)\}$, when taking into account how the CP is chosen.

While the design of the symbol sequence in FIG. 3 started with the creation of the first symbol 303 with CP 301 and adjusted the samples of the second symbol 304 and CP 302 based on this first symbol 303, it is also possible to e.g. start with the second symbol as the symbol to which the first symbol is cyclically adjusted.

According to an embodiment of the present invention, the symbol sequence may also comprise a third symbol with CP, where the third symbol is a copy of the second symbol with the samples shifted in analogy with the shift done in the second symbol. The sequence may continue with even more symbols with CP arranged in a corresponding way.

The resulting symbol sequence 308 will thus appear as an extended continuous symbol thanks to the precise cyclic shift described above, that matches adjacent symbols. For the sake of clarity and simplification, the symbol sequence of the present invention, designed according to the above description, will be called the extended symbol.

Figure 4:
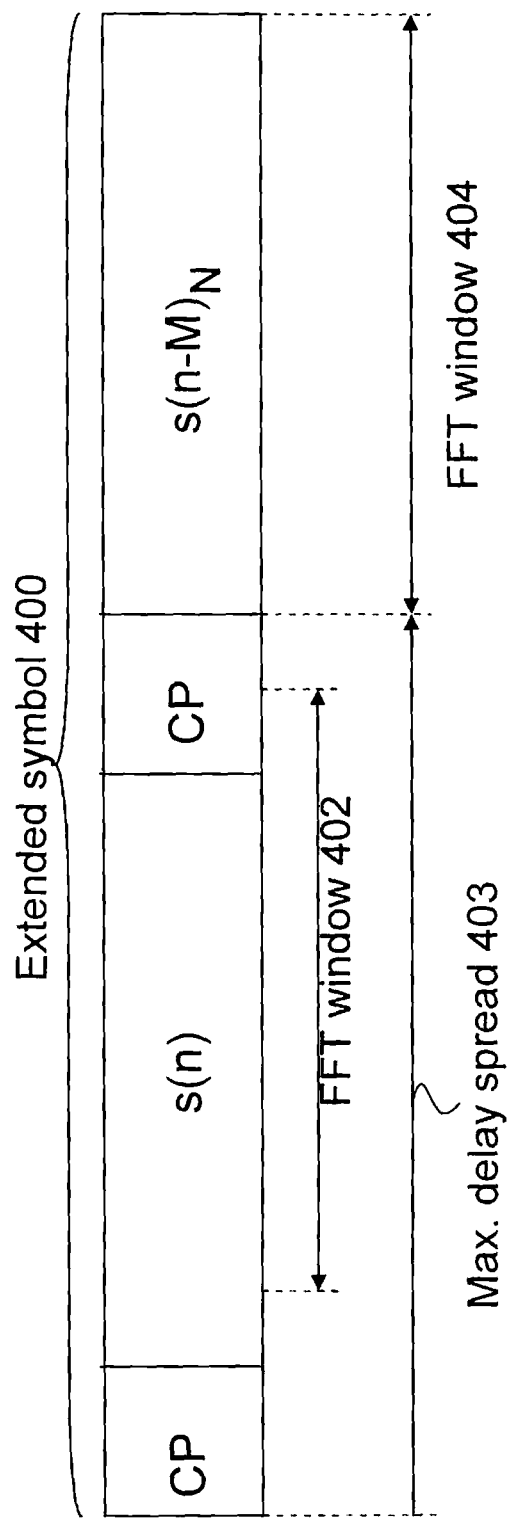
FIG. 4 illustrates schematically the flexible FFT window placing according to embodiments of the present invention.

Such an extended symbol allows for a greater flexibility for the receiver when placing its FFT window, as the FFT window may be placed anywhere during this extended symbol. Two examples of FFT placing are illustrated in FIG. 4. An FFT window 404 placed at the very end of the extended symbol 400 (in this example comprising two symbols with CP), will allow for a delay spread 403 corresponding to the duration of one symbol with CP plus one CP. The so called effective CP thus equals to one symbol plus two CP, which is the maximum delay spread that can be handled in this case. If the extended symbol comprises more than two symbols with CP, the effective CP can be even longer. The FFT window can thus be placed wherever wanted during the extended symbol and not only at the very end, as shown by the other FFT window 402 which is placed somewhere in the middle of the extended symbol. In FIG. 4, the sequence of samples in the first symbol is denoted s(n), where $n \in \{1, \ldots, N\}$, for simplicity and brevity. In the second symbol, the notation s(n-M)N denotes the signal sequence s(n) with N samples cyclically rotated M samples, in accordance with the second symbol in FIG. 3. This denotation will also be used in FIGS. 5 and 6.

As mentioned previously, another problem in systems with very large distances between transmitters and receivers such as in cellular systems with large cell sizes, is that the received power will typically be quite significantly reduced. It is thus of interest to provide methods and arrangements that allow for an efficient use of the received Signal to Noise Ratio (SNR) while at the same time allowing for a larger delay spread. In one embodiment of the present invention, illustrated schematically in FIG. 5, it is possible to obtain an effective CP duration 501 corresponding to two traditional CP durations, while using the existing available energy in the extended symbol 500 in an optimal way by exploiting two FFT windows 502, 503. In this embodiment the extended symbol 500 comprises two symbols with CP and the two FFT windows 502, 503, are lined up at the end of the extended symbol 500. This allows for coherent combining (maximum ratio combining) 506 of the two extracted signals 504, 505. Coherent combining of two signals provides a 3 dB gain. If K signals are combined (which is possible if the extended symbol comprises K symbols with CP), and if the interference is not time varying and the channel is static (no, or slow, variations over time), the gain will be 10 log(K) dB.

If the interference varies over time, more advanced combiners than maximum ratio combining could be used, such as Minimum Mean Square Error (MMSE) or Interference Rejection Combining (IRC), to suppress potential interference. Note that this combining can be done of the in time separately received signals 504, 505.

If no frequency offset remains, the two time domain signals can be directly combined. If a frequency offset exist, a phase compensation factor of $\exp(j2\pi\Delta fT)$ (T is the time separation of the start of the windows and $\Delta f$ is the frequency offset) need to be multiplied with the second signal prior to the addition.

Figure 5:
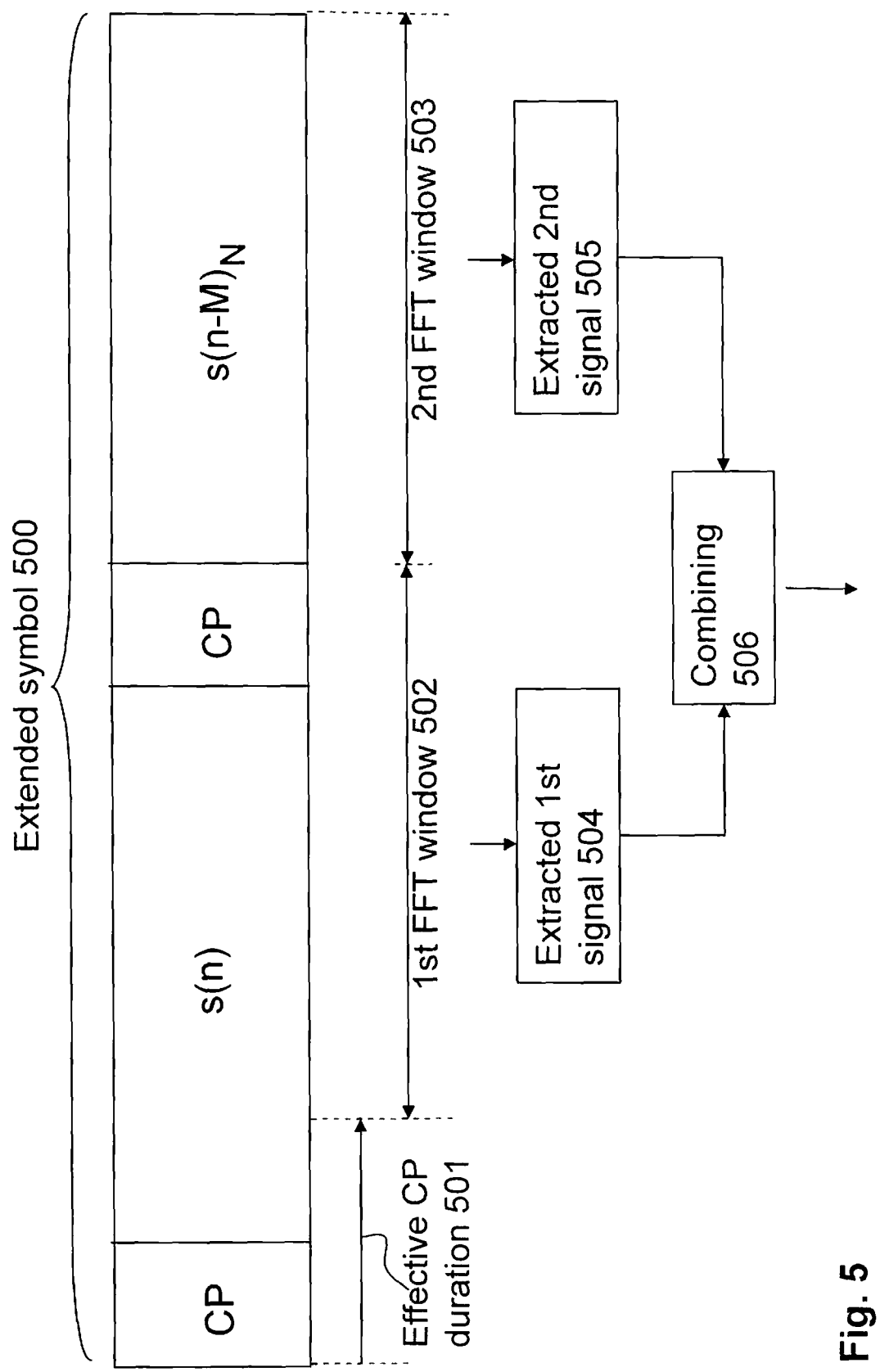
FIG. 5 illustrates schematically the placing of two FFT windows according to one embodiment of the present invention, giving SNR enhancements of the signal through combining.

The two FFT windows do not need to be placed perfectly aligned as illustrated in FIG. 5. In an alternative embodiment the FFT windows can overlap somewhat. There could also be some space in between the two FFT windows.

In still another embodiment of the present invention, the improved SNR of the signal obtained by the combination described above, can be used as a basis for the determination of a needed received power level. When the SNR is improved a lower received power can be accepted. This determination of the power level can thus be used for the power regulation of the radio base station in downlink and of the user equipment in uplink.

Figure 6:
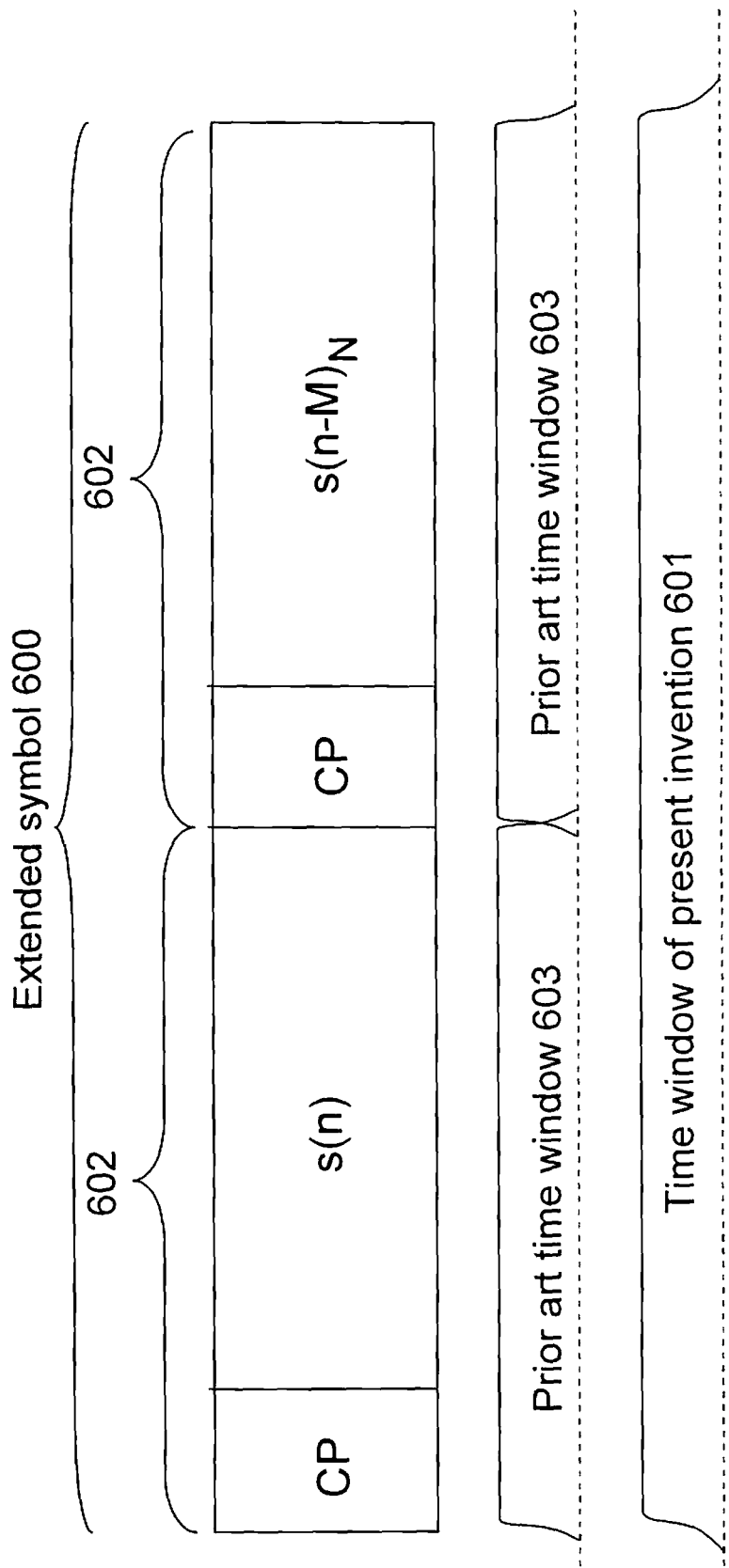
FIG. 6 illustrates schematically the time domain windowing according to one embodiment of the present invention.

Another embodiment of the present invention is schematically illustrated in FIG. 6. In prior art, time windowing can be used for reducing the spectral leakage, and the time window 603 can e.g. be a raised cosine window or similar, covering the duration of each symbol with CP 602. In the present invention time windowing 601 can be used for the same purpose. Ramping up and down of the power is then preferably done at the start and at the end of the extended symbol 600 and not at the start and the end of each symbol with CP 602 of the extended symbol 600. This will thus avoid ramping up and down the power when not needed.

Figure 7A:
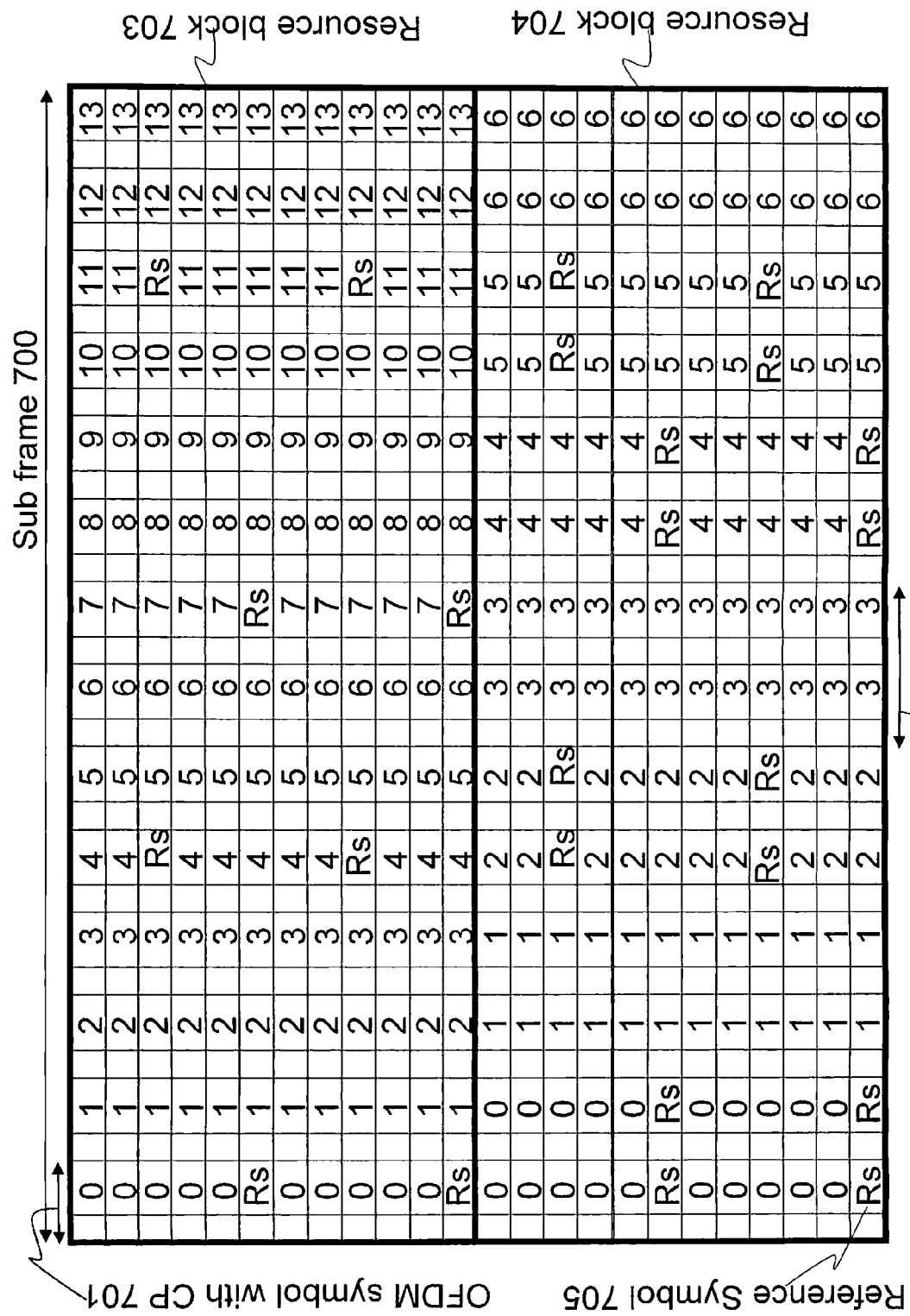
FIG. 7a illustrates schematically the mapping of OFDM symbols according to prior art and extended symbols according to an embodiment of the present invention in the LTE downlink frame structure.

Furthermore, the extended symbol according to the present invention is compatible with the interfaces in e.g. LTE with its traditional OFDM symbol. This means that the extended symbol can be used for users experiencing severe delay spread, while the traditional OFDM symbol can be used for other users. An example is schematically illustrated in FIG. 7a showing the mapping of OFDM symbols on two resource blocks of the downlink frame structure of LTE. One sub frame 700 comprises in total 14 OFDM symbols with CP 701. In the sub-frames, some of the symbols are used for reference symbols (Rs) 705. The extended symbol 702 of the present invention can e.g. be used in the sub frames of one resource block 704, while the traditional OFDM symbol with CP 701 can be used in the sub frames of another resource block 703 in the same sub-downlink frame. This is just one possible example of how it could look. In a system where the delay spread is so long that three OFDM symbols must be used, the frame structure would of course be different. Another option is that the radio base station adaptively adjust the number of OFDM symbols with CPs to use, based on intended user equipment and associated propagation conditions. i.e. the radio base station may select to just send one OFDM symbol with CP or one extended symbol according to the invention.

Figure 7B:
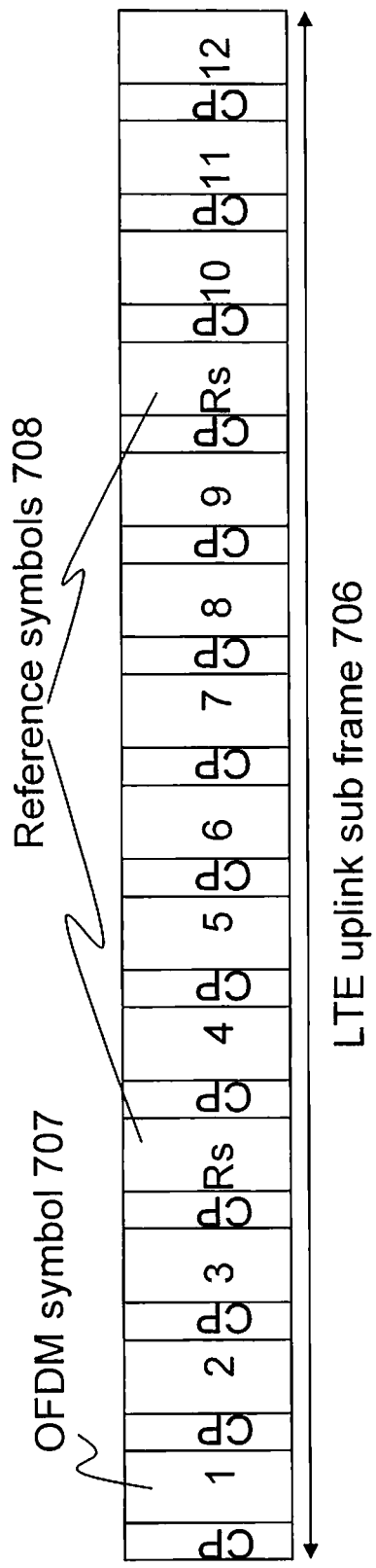
FIG. 7b illustrates schematically the mapping of symbols in an LTE uplink sub frame according to prior art.
Figure 7C:
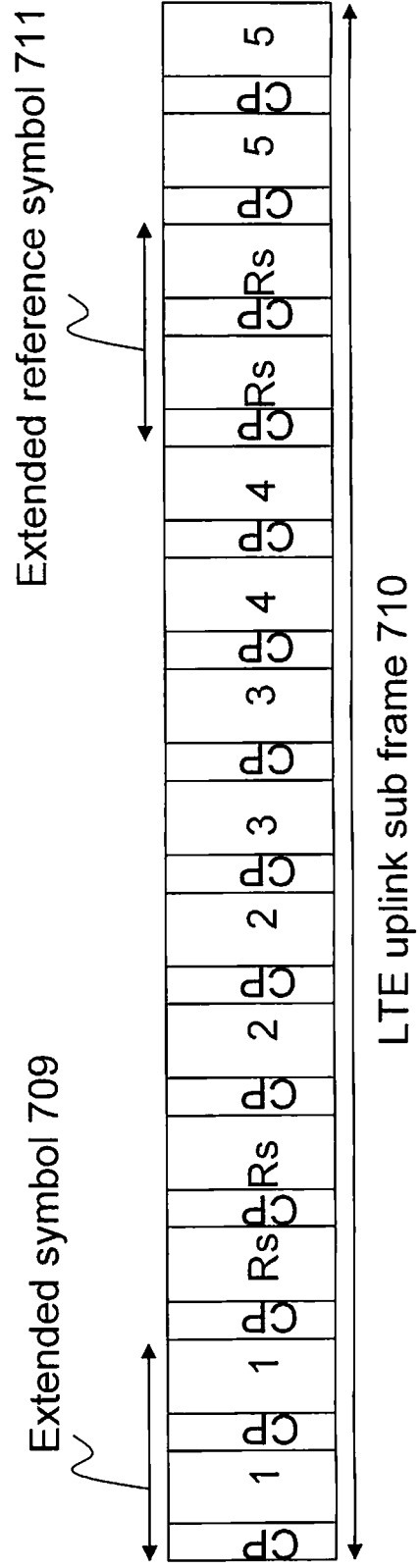
FIG. 7c illustrates schematically the mapping of extended symbols in an LTE uplink sub frame according to an embodiment of the present invention.

Another example of the compatibility with traditional LTE OFDM symbols is schematically illustrated in FIG. 7b-c showing the mapping of symbols in an LTE uplink sub frame according to prior art (FIG. 7b) and according to an embodiment of the present invention (FIG. 7c). The traditional LTE uplink sub frame 706 comprises 14 OFDM symbols 707 with CP of which two are reference symbols (Rs) 708. In an embodiment of the invention illustrated in FIG. 7c, each extended symbol 709 comprises two OFDM symbols with CP, which means that an LTE uplink sub frame 710 in this case carries seven extended symbols of which two are extended reference symbols 711.

The use of extended OFDM symbols according to the invention also needs to be signaled to the UE. This can be done implicitly or explicitly. With implicit signaling, it is meant that the receiving unit can determine, e.g. through a sliding correlation of two symbol lengths, that two successive signals are based on the same sample sequence if the result from the correlation exceeds a threshold level. After detecting such signal format, the receiver may, as described in the invention, apply a single FFT window or multiple non overlapping or partially overlapping FFT windows after the ISI has subsided. In the explicit signaling method, a message signaling various parameters such as modulation and forward error correction code on the downlink also carries a message that multiple OFDM symbols will be sent. For LTE, one could for instance signal such information in Physical Downlink Control Channel (PDCCH). No signaling is needed on the uplink as the radio base station will know if an extended symbol is used, in the same way as it already knows the modulation e.g.

Figure 8:
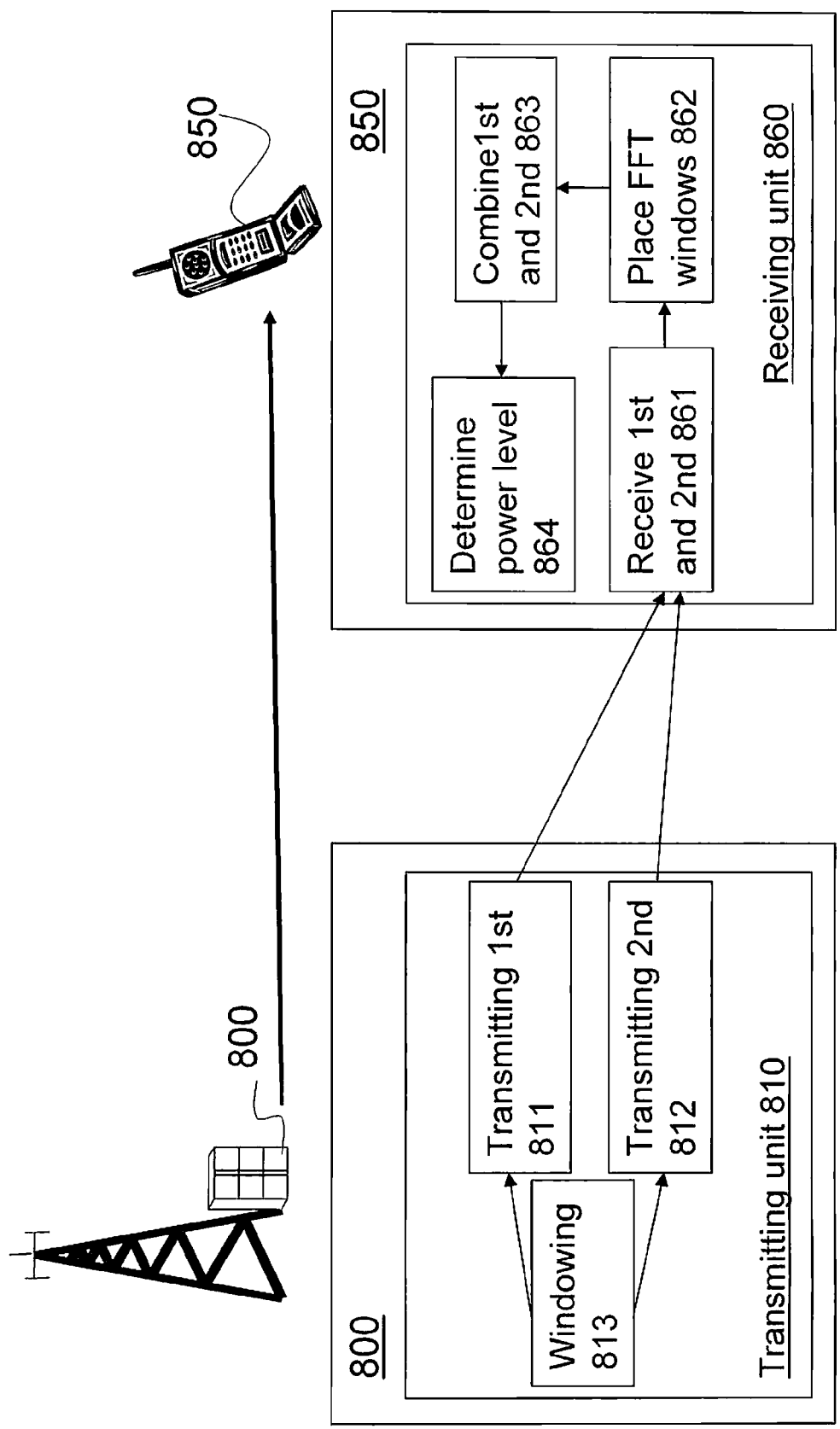
FIG. 8 illustrates schematically a part of a wireless communication system wherein the present invention may be implemented and the transmitting and the receiving units according to embodiments of the present invention.

Schematically illustrated in FIG. 8 and according to one embodiment, the transmitting unit 810 in the radio base station 800 comprises means for transmitting 811 a first symbol of the symbol sequence preceded by a first CP and means for transmitting 812 a second symbol of the symbol sequence preceded by a second CP, the second symbol comprising the samples of the first symbol shifted so that the last sample of the first symbol and the first sample of the second CP are cyclically consecutive. In addition to this, the transmitting unit comprises means for windowing 813 the symbol sequence, if time windowing is used in order to reduce spectral leakage.

Also illustrated in FIG. 8 is the receiving unit in the UE 850. It comprises means for receiving 861 a first symbol of the sequence preceded by a first CP, and a second symbol of the sequence preceded by a second CP. The second symbol comprises the samples of the first symbol shifted so that the last sample of the first symbol and the first sample of the second CP are cyclically consecutive. The unit also comprises means for placing 862 at least one FFT window during the symbol sequence. Furthermore, the receiving unit comprises means for combining 863 the signal of the FFT windows to one combined signal with improved SNR, if two FFT windows have been placed. The unit also comprises means for determining 864 the needed received power level based on the SNR of the combined signal, which can be used for power control.

It should be noted that it is a downlink scenario that is illustrated in FIG. 8. However, the present invention is applicable to both uplink and downlink, which implies that a radio base station 800 will normally comprise both the transmitting unit 810 and the receiving unit 860 and the same goes for a UE.

Figure 9:
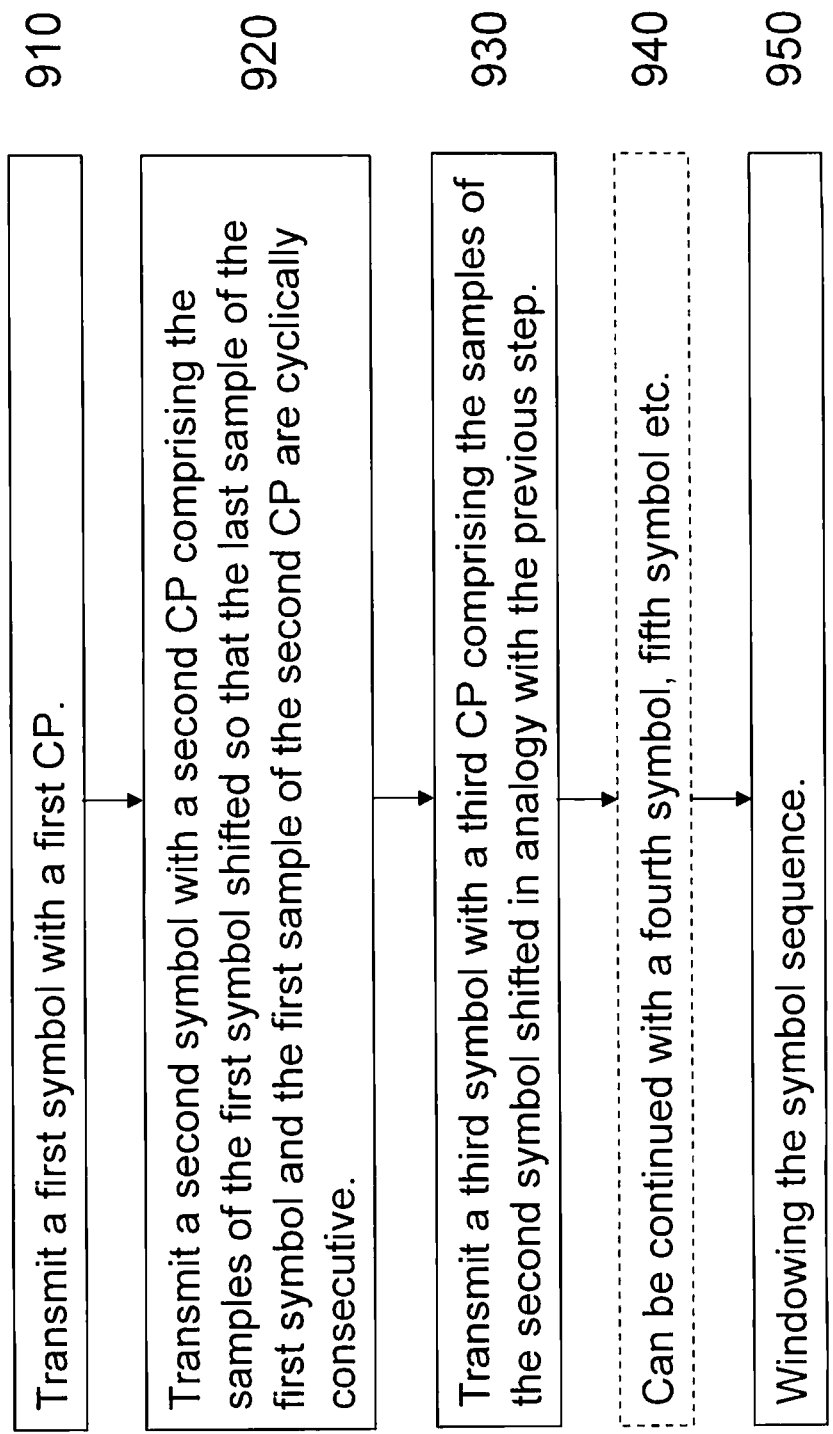
FIGS. 9 and 10 are flowcharts of the methods according to embodiments of the present invention.

FIG. 9 is a flowchart of the method for the transmitting unit, according to one embodiment of the present invention. It comprises the steps:
  910: Transmit a first symbol of the sequence preceded by a first CP.
  920: Transmit a second symbol of the sequence preceded by a second CP. The second symbol comprises the samples of the first symbol shifted so that the last sample of the first symbol and the first sample of the second CP are cyclically consecutive.
  930: Transmit a third symbol of the sequence preceded by a third CP. The third symbol comprises the samples of the second symbol shifted so that the last sample of the second symbol and the first sample of the third CP are cyclically consecutive.
  940: Transmit a fourth, fifth, sixth etc. symbol of the sequence preceded by a CP in analogy with the previous step.
  950: Window the symbol sequence, if time windowing is used in order to reduce spectral sequence.

Figure 10:
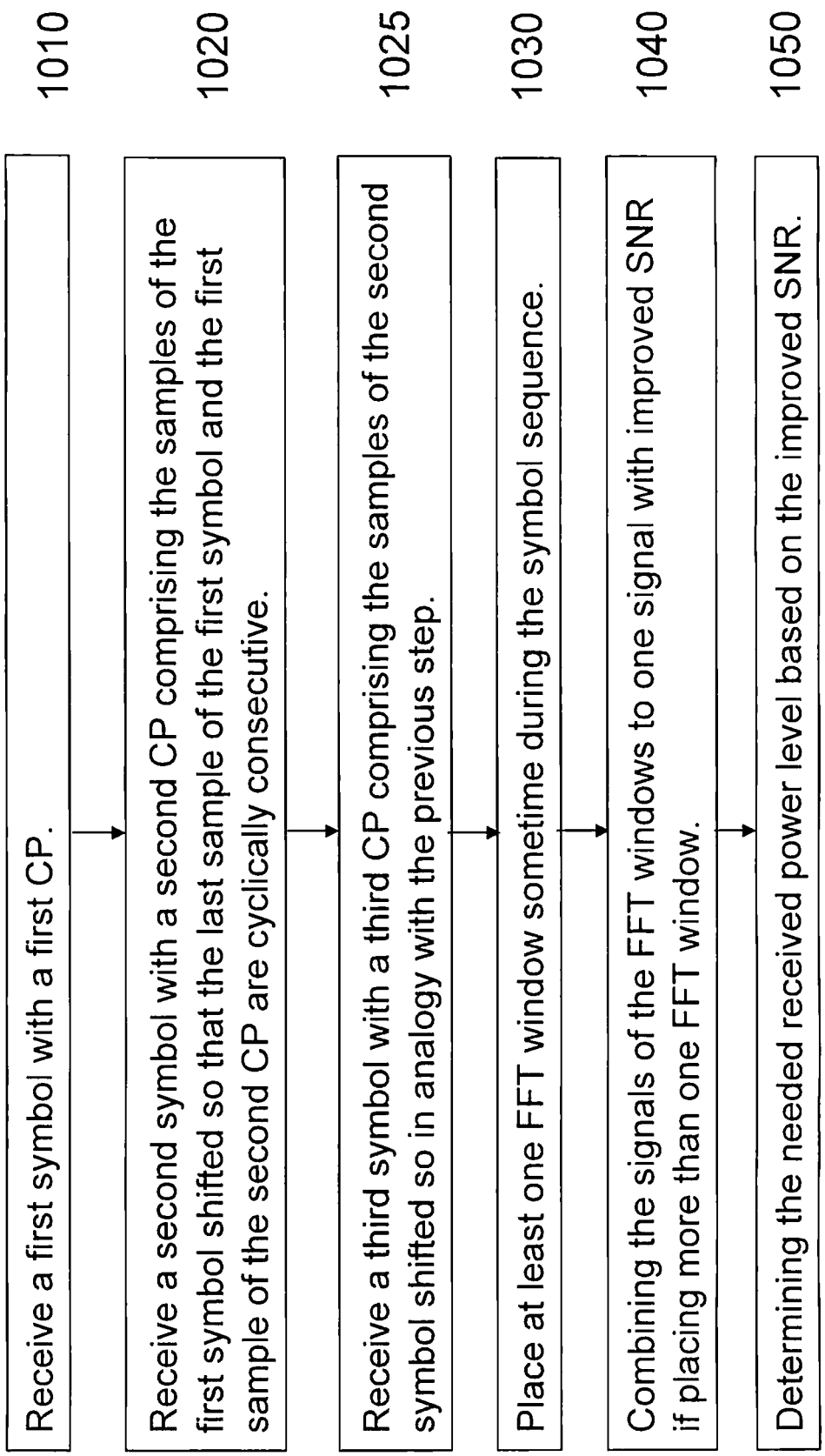

Furthermore, FIG. 10 is a flowchart of the method for the receiving unit, according to one embodiment of the present invention. It comprises the steps:
  1010: Receive a first symbol of the sequence preceded by a first CP.
  1020: Receive a second symbol of the sequence preceded by a second CP. The second symbol comprises the samples of the first symbol shifted so that the last sample of the first symbol and the first sample of the second CP are cyclically consecutive.
  1025: Receive a third symbol of the sequence preceded by a third CP. The third symbol comprises the samples of the second symbol shifted so that the last sample of the second symbol and the first sample of the third CP are cyclically consecutive
  1030: Place at least one FFT window during the symbol sequence.
  1040: Combine the signals of the FFT windows to a signal with improved SNR, if more than one FFT window has been placed.
  1050: Determine the needed received power level, based on the improved SNR of the combined signal, in order to be able to use it for power regulation.

The above mentioned and described embodiments are only given as examples and should not be limiting to the present invention. Other solutions, uses, objectives, and functions within the scope of the invention as claimed in the accompanying patent claims should be apparent for the person skilled in the art.

The invention claimed is:

1. A method for a wireless communication system supporting cyclic-prefix insertion, using a symbol sequence having a number of samples for transmission over a radio channel, the method comprising:
    transmitting a first symbol of the symbol sequence preceded by a first cyclic-prefix, and
    transmitting a second symbol of the symbol sequence preceded by a second cyclic-prefix, wherein the second symbol comprises samples of the first symbol shifted so that a last sample of the first symbol and a first sample of the second cyclic-prefix are cyclically consecutive.

2. The method of claim 1, further comprising transmitting a third symbol of the symbol sequence preceded by a third cyclic-prefix, wherein the third symbol comprises samples of the second symbol shifted so that a last sample of the second symbol and a first sample of the third cyclic-prefix are cyclically consecutive.

3. The method of claim 1, further comprising windowing the symbol sequence to reduce spectral leakage.

4. A method for a wireless communication system supporting cyclic-prefix insertion, using a symbol sequence having a number of samples for transmission over a radio channel, the method comprising:
    receiving a first symbol of the symbol sequence preceded by a first cyclic-prefix;
    receiving a second symbol of the symbol sequence preceded by a second cyclic-prefix, wherein the second symbol comprises samples of the first symbol shifted so that a last sample of the first symbol and a first sample of the second cyclic-prefix are cyclically consecutive; and
    placing at least one Fast Fourier Transform (FFT) window during the symbol sequence.

5. The method of claim 4, further comprising before placing the at least one FFT window, receiving a third symbol of the symbol sequence preceded by a third cyclic-prefix, wherein the third symbol comprises samples of the second symbol shifted so that a last sample of the second symbol and a first sample of the third cyclic-prefix are cyclically consecutive.

6. The method of claim 4, wherein at least two FFT windows are placed one after the other.

7. The method of claim 6, further comprising combining signals of the at least two FFT windows to a combined signal with increased signal to noise ratio.

8. The method of claim 7, further comprising determining a needed received power level, based on the signal to noise ratio of the combined signal.

9. The method of claim 4, wherein at least two FFT windows are partly overlapping.

10. A transmitting unit for a wireless communication system supporting cyclic-prefix insertion, using a symbol sequence having a number of samples for transmission over a radio channel, the unit comprising:
    a transmitter configured for transmitting a first symbol of the symbol sequence preceded by a first cyclic-prefix, and
    a transmitter configured for transmitting a second symbol of the symbol sequence preceded by a second cyclic-prefix, wherein the second symbol comprises samples of the first symbol shifted so that a last sample of the first symbol and a first sample of the second cyclic-prefix are cyclically consecutive.

11. The transmitting unit of claim 10, further comprising a transmitter configured for transmitting a third symbol of the symbol sequence preceded by a third cyclic-prefix, wherein the third symbol comprises samples of the second symbol shifted so that a last sample of the second symbol and a first sample of the third cyclic-prefix are cyclically consecutive.

12. The transmitting unit of claim 10, comprising a device configured for windowing the symbol sequence to reduce spectral leakage.

13. The transmitting unit of claim 10, wherein the transmitting unit is configured for inclusion in a radio base station.

14. The transmitting unit of claim 10, wherein the transmitting unit is configured for inclusion in a user equipment.

15. A receiving unit for a wireless communication system supporting cyclic-prefix insertion, using a symbol sequence comprising a number of samples for transmission over a radio channel, the unit comprising:
    a receiver configured for receiving a first symbol of the symbol sequence preceded by a first cyclic-prefix;
    a receiver for receiving a second symbol of the symbol sequence preceded by a second cyclic-prefix, wherein the second symbol comprises samples of the first symbol shifted so that a last sample of the first symbol and a first sample of the second cyclic-prefix are cyclically consecutive; and
    a device configured for placing at least one Fast Fourier Transform (FFT) window during the symbol sequence.

16. The receiving unit of claim 15, further comprising a receiver configured for receiving a third symbol of the sequence preceded by a third cyclic-prefix, wherein the third symbol comprises samples of the second symbol shifted so that a last sample of the second symbol and a first sample of the third cyclic-prefix are cyclically consecutive.

17. The receiving unit of claim 15, wherein at least two FFT windows are placed one after the other.

18. The receiving unit of claim 17, further comprising a combinder configured for combining signals of the FFT windows to a combined signal with increased signal to noise ratio.

19. The receiving unit of claim 18, further comprising a device configured for determining a needed received power level, based on a signal to noise ratio of the combined signal.

20. The receiving unit of claim 15, wherein at least two FFT windows are placed partly overlapping.

21. The receiving unit of claim 15, wherein the receiving unit is configured to be placed in a radio base station.

22. The receiving unit of claim 15, wherein the receiving unit is configured to be placed in a user equipment.

* * * * *